INVENTOR
Floyd E. Adamson

Feb. 13, 1968  F. E. ADAMSON  3,369,146
CONSTANT-FEED CONSUMABLE-ELECTRODE ARC-WELDING APPARATUS
Filed Oct. 16, 1964  3 Sheets-Sheet 3
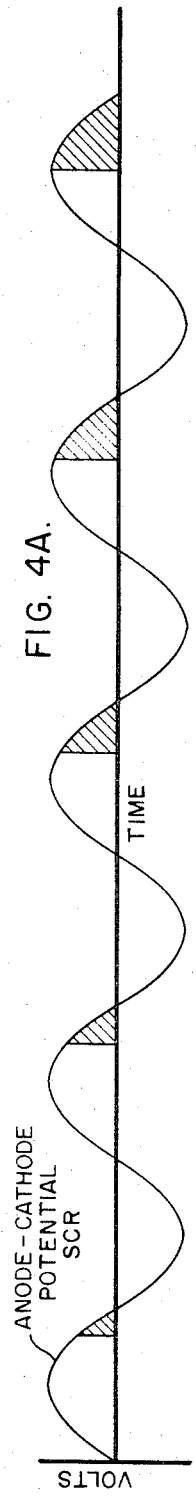
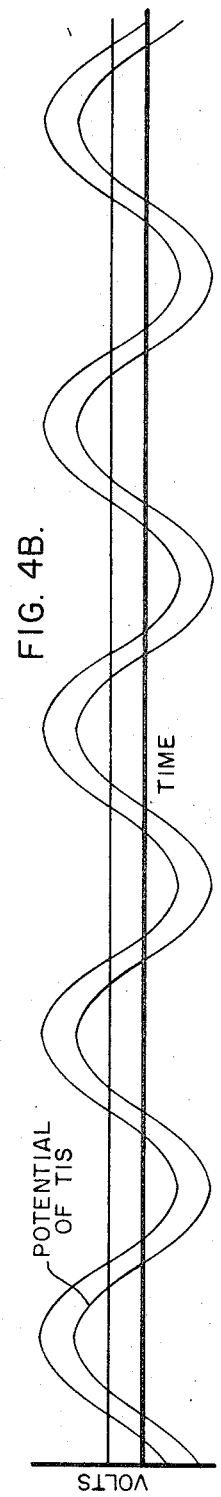
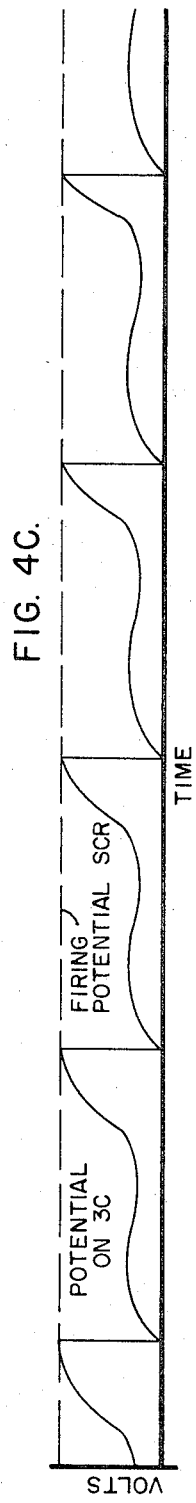
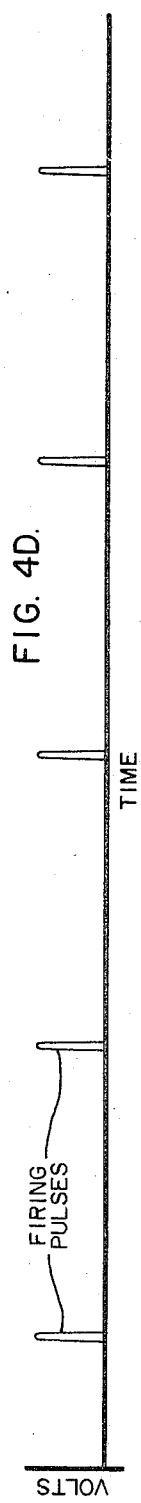

United States Patent Office 3,369,146
Patented Feb. 13, 1968

3,369,146
CONSTANT-FEED CONSUMABLE-ELECTRODE
ARC-WELDING APPARATUS
Floyd E. Adamson, Eggertsville, Buffalo, N.Y., assignor to Westinghouse Electric Corporation, East Pittsburgh, Pa., a corporation of Pennsylvania
Filed Oct. 16, 1964, Ser. No. 404,325
3 Claims. (Cl 314—74)

This invention relates to arc welding with a continuously supplied consumable electrode and has particular relationship to a drive for the electrode. In arc welding with a continuously supplied consumable electrode, it is important that the electrode flow continuously at a constant speed and without appreciable interruption into the arc. Typically the electrode may be derived from a reel remote from the site of the welding and supplied through a hollow flexible cable or conduit. Changes in speed of the electrode could be caused, for example, by increased or decreased friction between the electrode and the cable by reason of movement of the cable by the operator during semiautomatic welding, or by changes in friction as the electrode is pulled from a payoff pack in fully automatic welding. Changes in the speed of the electrode varies the welding current correspondingly and this changes the bead size or penetration of its weld.

In accordance with the teachings of the prior art electrode-drive apparatus purposed to maintain the speed of the electrode substantially constant has been provided. When the welding arc is energized from a so-called constant current supply, the electrode-drive motor is connected across the arc and the speed of the motor and with it the speed of the electrode is regulated by the variations of potential which occur across the arc as the electrode speed varies. In constant-potential welding apparatus the electrode drive motor is supplied, in accordance with the teachings of the prior art, through a thyratron which is controlled to compensate for the I-R drop across the motor as the motor varies and this compensation has the effect of reducing the speed variations of the motor and thus reduce the speed variations in the flow of the electrode into the arc.

While the prior art apparatus has produced reasonably satisfactory results the extended use of arc welding to more sophisticated purposes has demanded that the electrode speed be maintained more uniform than is feasible with this prior art apparatus. This invention concerns itself particularly with the electrode drives for constant-potential or near constant-potential welding and it is an object of this invention to provide such electrode-drive apparatus which shall supply the electrode at a highly uniform speed so that a very steady and smooth arc is maintained.

This invention arises from the discovery that the desired electrode speed uniformity and smooth arc may be achieved by supplying the electrode-drive motor through a properly controlled silicon controlled rectifier. The control is effected by supplying the gate electrode of the silicon-controlled rectifier with a composite potential which sets the instants in the half periods of the supply potential at which the controlled rectifier conducts current through the armature of the motor in such a way as to suppress speed variation. This composite potential includes principally an alternating-current component, a direct current component which is in magnitude dependent on the loading on the motor, and the counterelectromotive force across the motor. This composite potential is impressed to charge a capacitor. The motor loading-dependent potential and the bias is connected in the charging circuit for the capacitor in such a manner as to oppose the counter-electromotive force across the motor. The controlling alternating current potential is connected so as to be superimposed on the difference between the loading-dependent potential plus bias and the counterelectromotive force. The capacitor is connected to the gating electrode of the silicon controlled rectifier through a four-layer diode. This diode becomes conducting when the capacitor potential reaches a predetermined magnitude and at this point conducts for a time interval which is relatively short compared to a half period of the alternating potential impressed between the anode and the cathode of the silicon controlled rectifier. The pulse conducted by the four-layer diode reliably fires the silicon controlled rectifier causing it to conduct current through the electrode-drive motor. The relative polarities of the loading-dependent potential and the counterelectromotive force are such that the higher the loading-dependent potential the higher the potential of the capacitor in the direction in which the four-layer diode is rendered conducting in the half periods of the alternating potential impressed between the anode and the cathode of the silicon controlled rectifier, the greater the loading-dependent potential. Uniform electrode speed is thus achieved.

The uniformity of the speed of the electrode is further improved by suppressing the effect of the potential produced by the decay of flux in the motor armature during the half periods of the supply when the silicon controlled rectifier is not conducting. This suppression is effected by connecting a diode across the armature in such a sense as to short circuit the voltage produced by the decay of flux in the armature.

Certain novel features considered characteristic of this invention are disclosed generally above. For a better understanding of this invention, both as to its organization and as to its method of operation, together with additional objects and advantages thereof, reference is made to the following description taken in connection with the accompanying drawing, in which:

FIGS. 4A, 4B, 4C, 4D are graphs illustrating the operation of the apparatus shown in FIGS. 1 and 2.

FIG. 2 is presented in this application for the purpose of aiding those skilled in the art in practicing this invention and not with an intention of any way limiting this invention.

Figure 1:
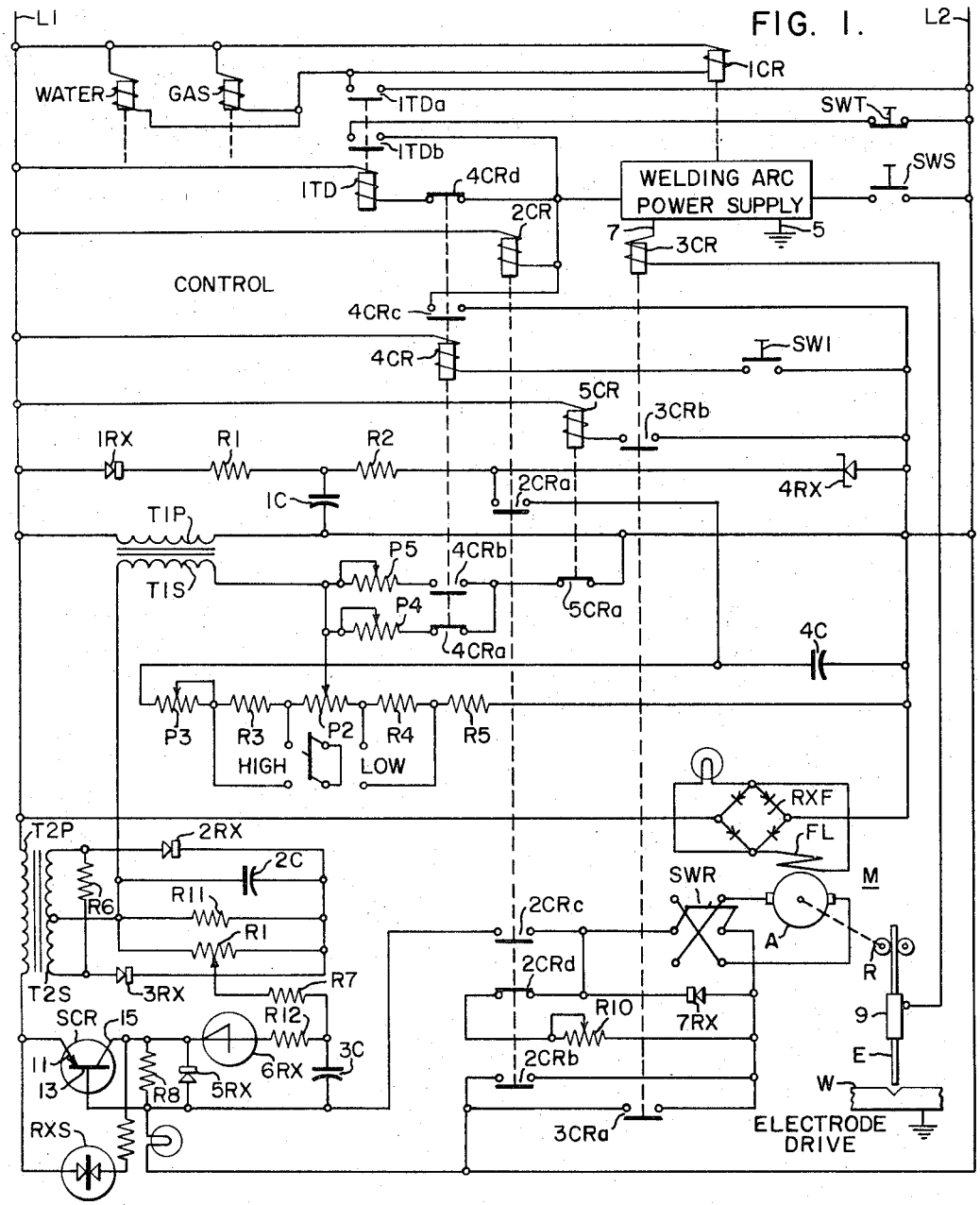
FIG. 1 is a schematic of a preferred embodiment of this invention.

The apparatus shown in FIG. 1 includes a Welding-Arc Power Supply for firing and maintaining an arc between an electrode E and work W, a gun for advancing the electrode E into welding relationship with the work W, an Electrode Drive for actuating the electrode advancing mechanism of the gun, and a Control for controlling the operation of these parts of the apparatus. Power for the welding arc may be derived from the bases B a single phase or polyphase commercial source. The Control and Electrode Drive are energized from conductors L1 and L2 which are fed from a single-phase commercial source. Usually conductors L1 and L2 are energized from the welding arc source through a suitable transformer (not shown).

The apparatus is provided with a starting switch SWS, stop switch SWT and an inching switch SWI. The switches SWS, SWT and SWI may be on the Gun for semi-automatic welding or they may be available in an operator's position in situations in which the welding is fully automatic.

The Welding-Arc Power Supply may be of the constant-potential type as disclosed in Bichsel Patent 2,786,160 or may be of the type having a voltage-current characteristic with a low rising or decaying rate of change of voltage as a function of current. This Supply usually supplies direct current and has a pair of output terminals 5 and 7 one of which, 5, is grounded and the other of which, 7, is connected to the elect rode, through the coil of a current relay 3CR, to the electrode guide-tube 9 of the Gun and through this tube 9 to the electrode E.

In the practice of this invention the welding operation may be semiautomatic or fully automatic. For semiautomatic operation the Gun may be of the type disclosed in Miller Patent 2,806,125. In the event that the operation is fully automatic the Gun is a torch such as is disclosed in Bichsel Patent 2,813,193. In either case the Gun includes a channel through which the electrode E is advanced into welding relationship with the work W. This channel includes the electrode guide tube through which welding current is transmitted.

Typically, the electrode E is advanced from a reel (not shown), through a flexible cable (not shown) by rollers R and is actuated by these rollers to move through the channel in the gun. The electrode is driven by a motor M of the Electrode Drive which includes an armature A and a field winding FL. The field FL of the motor is supplied with direct current potential from conductors L1 and L2 through rectifier RXF.

The Electrode Drive includes a silicon-controlled rectifier SCR having an anode 11, a cathode 13 and a gate 15. The anode 11 is connected to the conductor L1 through the primary T2P of a transformer T2 which supplies the motor-load-dependent potential. The cathode 13 is adapted to be connected to the armature A of the motor M through the front contact 2CRc of a relay 2CR in the Control and through reversing switch SWR which sets the direction of rotation of the motor M. The armature circuit is adapted to be completed to conductor L2 through the front contacts 2CRb of relay 2CR or the front contacts 3CRa of the current relay 3CR.

The armature A is shunted by a braking resistor R10 through back contact 2CRc of the relay 2CR. During operation the braking resistor is disconnected from the armature A by the opening of contact 2CRd.

With respect to the braking resistor R10 and the contact 2CRc the Electrode Drive may be operated in different ways depending on the shielding gas used. When the shielding gas is of the inert type, such as argon, the braking resistor R10 is connected directly across the motor through the contact 2CRd and the contact 2CRc is effective in the armature circuit. Under such circumstance the motor M is immediately stopped at the end of a welding operation by the reclosing of 2CRd and the opening of 2CRc. In situations in which the shielding gas is carbon dioxide the braking resistor is disconnected from the armature A and the contact 2CRc is short circuited by a jumper. In this case, at the end of a welding operation when relay 2CRa is opened the capacitor 4C discharges through the variable resistor P3 and resistors R3, P2, R4 and R5 and the motor speed gradually decays to zero eliminating any tendency to produce a crater.

The silicon controlled rectifier SCR is provided with a firing network FN which is connected between the gate 15 and the cathode 13. This network FN includes a capacitor 3C, a resistor R12, a four-layer diode 6RX, and a resistor R8. The resistor R8 is shunted by a diode 5RX. The resistor R8 is connected directly between the gate 15 and the cathode 13. During firing the capacitor C3 discharges through the resistor R12, the four-layer diode 6RX and the gate 15 and the cathode 13. The diode 5RX suppresses the flow of current of positive polarity from the cathode 13 to the gate 15 should the charge on the capacitor 3C be reversed. Such current would damage the controlled rectifier SCR.

Figure 3:
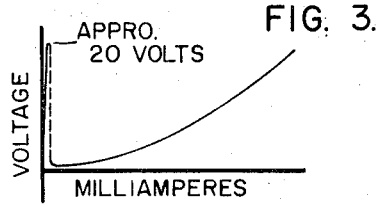
FIG. 3 is a graph illustrating the operation of a four-layer diode in the practice of this invention.
Figure 2:
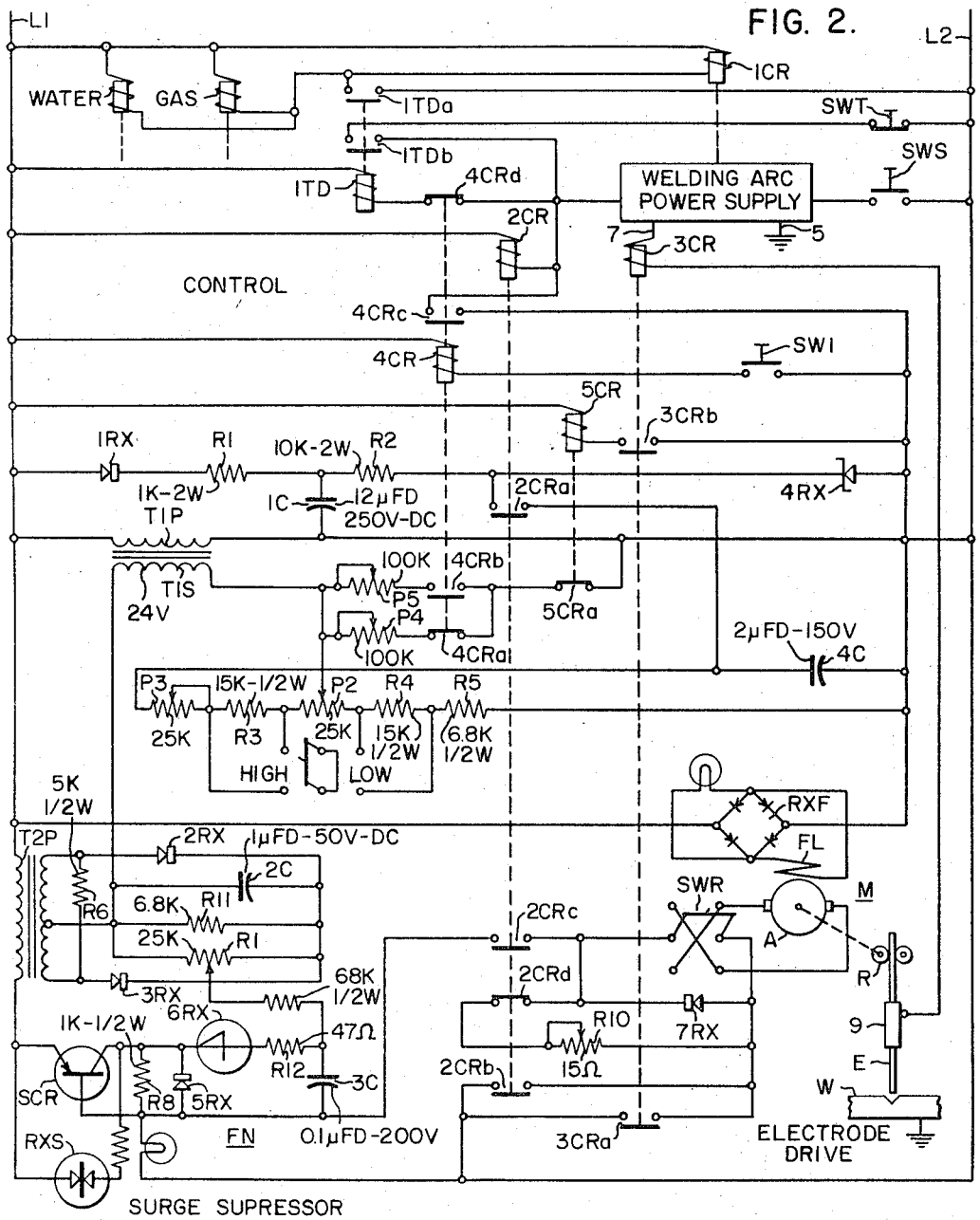
FIG. 2 is a schematic similar to FIG. 1 but showing the magnitudes of the components of apparatus used in the actual practice of this invention which was found to operate highly satisfactorily.

The operation of the four-layer diode 6RX is illustrated in FIG. 3 in which the voltage across the diode which would be impressed by the capacitor 3C is plotted vertically and current in milliamperes horizontally. When the potential across the four-layer diode is substantially less than 20 volts the diode is nonconducting. When the potential across the four-layer diode 6RX reaches approximately 20 volts the diode breaks down becoming abruptly conducting and a pulse of current flows through this diode and the gate 15 and cathode 13.

The capacitor 3C is connected in a charging circuit in which a composite potential is impressed. This potential includes an alternating-current component derived from the secondary T1S of the transformer T1, the primary T1P of which is supplied from conductors L1 and L2. In addition, there is a biasing potential. This biasing potential is derived from variable resistor P2. The resistor P2 is supplied with potential from a network including capacitor 1C which is charged through rectifier 1RX and resistor R1. The capacitor 1C is shunted by a Zener diode 4RX and resistor R2. Substantially constant potential is derived from the Zener diode 4RX through the contact 2CRa of the relay 2CR to charge the capacitor 4C. The variable resistor P2 is connected across capacitor 4C through a variable resistor P3 and resistor R3, R4 and R5. Resistor R3 and R4 may be selectively shunted out. If the motor M is to operate in its high speed range, resistor R3 is shunted out and if the motor M is to operate in its low speed range, resistor R4 is shunted out. If after capacitor 4C is charged contact 2CRa is opened, capacitor 4C discharges during a predetermined time interval through resistors P3, R3, P2, R4, R5. If 2CRc is shorted and dynamic braking resistor R10 is out of the circuit, the speed of the motor M is gradually reduced during this interval for crater suppression.

The charging circuit for capacitor 3C also includes a variable resistor P1 through which the motor-loading-dependent potential is derived. This potential is derived from the transformer T2, the secondary T2S of which is connected to charge a capacitor 2C through rectifier 2RX and 3RX connected in a full-wave circuit. The secondary T2S is loaded by resistor R6. The capacitor is shunted by resistor R11 and by the variable resistor P1. The charging circuit for the capacitor 3C also includes the counterelectromotive force derivable from the armature A of the motor M.

The charging circuit extends from conductor L2 through resistors R5, R4, P2, the arm of resistor P2, the secondary T1S, the arm of resistor P1, a resistor R7, the capacitor 3C, the contact 2CRc, the reversing switch SWR, the armature A, the contact 2CRb or the contact 3CRa to the conductor L2. The resistor R7 introduces a phase displacement, with reference to the potential derivable from L1 and L2, in the control alternating potential derivable from T1S. In this circuit the bias derivable from P2 and the motor-loading-dependent potential derivable from P1 are connected to charge the capacitor to a polarity such that its plate electrically nearest the four-layer diode 6RX is positive and its other plate is negative. The counter-electromotive force of the armature A is of the opposite polarity tending to charge the capacitor 3C so that its plate electrically remote from the four-layer diode 6RX is positive and its other plate is negative. The net potential impressed then depends essentially on the difference between the loading-dependent potential plus the bias derived from P2 and the counter EMF. As the loading-dependent potential increases, or the bias derived from P2 is increased, the positive potential impressed on the four-layer diode 6RX rises faster to the discharge magnitude for the diode 6RX and the capacitor 3C is discharged earlier to the half periods of the supply.

For automatic operation, the Electrode Drive includes the branch circuit including the variable resistor P4 which is connected between the arm of P2 and the conductor L2 through the back contact 4CRa and 5CRa of the relays 4CR and 5CR in the Control. For inching, the branch circuit including the variable resistor P5 serves. This resistor is adapted to be connected between the arm of P2 and the conductor L2 through front contact 4CRb and back contact 5CRa. At the start of a welding operation P4 is connected to control the speed of the motor M. P4 is set so that the motor M rotates at a relatively low speed advancing the electrode towards the work at this low speed. Once the electrode contacts the work back contact 5CRa opens and the motor is driven at the speed determined by the setting of P2 which may be high or low depending on the setting of switch SW1. During inching 4CR is actuated so that P5 controls the speed of the motor M.

The rectifier SCR is rendered conducting, the earlier, in alternate half periods of the potential derived from the conductors L1 and L2, the greater the rate of increase of the potential on capacitor 3C at the polarity at which the plate of 3C electrically nearest the four-layer diode 6RX is positive. Thus, the higher the potential supplied by the variable resistor P1 and/or the variable resistor P2 the earlier the instants in the alternate half periods when the rectifier SCR is rendered conducting; the higher the counterelectromotive force on the motor M the later the instants in the half periods when the rectifier SCR is rendered conducting. The earlier in the half periods the rectifier SCR is rendered conducting the greater the voltage it supplies to the armature A. Thus, more current is supplied to the motor M with electrical potential of the arm of variable resistor P2 nearer the potential of the arm of P3 than with this potential of the arm of P2 nearer the potential of the conductor L2. The effect of resistors P4 or P5 is to reduce this electrical potential of the arm of P2 to the electrode approach or electrode inching magnitudes. Likewise, the higher the electrical potential of the arm of P1 the greater the voltage impressed on the motor M and the higher its speed. The potentials of P1 and P2 are counteracted by the counterelectromotive force of the motor M and the speed is maintained at a corresponding predetermined magnitude.

The important aspect of this invention is that the rectifier SCR responds so reliably to the changes in the counterelectromotive force and in the loading-depending-potential (P1) that the speed of the electrode as it advances into the arc is maintained substantially constant and the arc is smooth.

To prevent spurious operation of the rectifier SCR which would cause the electrode to be advanced irregularly, a rectifier 7RX is connected across the armature A in such a sense as to absorb the back potential produced by the decay of flux in the armature during the half periods during which the supply potential has a polarity such as to tend to block conduction through 7CR. This prevents the supply of substantial back potential of the armature A through conductors L2 and L1 to the rectifier SCR. Such potentials would tend to maintain the rectifier SCR conducting during the alternate half periods when the potential of L1 is negative with respect to L2 and thus militate against the precise control of this rectifier SCR by the potentials impressed in the Electrode Drive.

To protect the rectifier SCR against surges a surge suppressor RXS is provided. This surge suppressor prevents surges having an amplitude in excess of 300 volts of either polarity from being impressed across the rectifier SCR.

The Control includes the time delay relay 1TD and the relays 1CR, 2CR, 4CR and 5CR. The relay 1CR is in the Welding-Arc Power Supply and when activated energizes the power Supply so that potential appears on conductor 7. In addition, it includes solenoids for the gas and the water which are supplied to the Gun. The relay 1TD has a contact 1TDI which closes instantaneously when the coil of 1TD is energized and opens instantaneously when this coil is deenergized. Relay 1TD also has a contact 1TDa which closes instantaneously when the coil is energized but opens after a predetermined interval after the coil is deenergized.

In explaining the operation of the apparatus it will be assumed that a fully automatic operation is being carried out. It will be assumed that 2CRc is short-circuited by a jumper and braking resistor R10 is disconnected from the armature A.

To carry out a welding operation the operator threads the electrode E into the Gun and mounts the Gun in automatic welding relationship with the work W. The operator then momentarily closes the switch SWS. The following circuits are then closed through 1TD and 2CR: L1, 1TD, 4CRd, SWS, L2; L1, 2CR, SWS, L2. Relays 1TD and 2CR are locked in through 1TDI and SWT. Contact 1TDa closes energizing 1CR and the gas and water solenoids. The actuation of relay 1CR closes a contact (not shown) in the Welding-Arc Power Supply so that the Supply is energized and potential appears through conductor 7 on the guide tube 9 connected to the electrode E. The actuation of the gas and water solenoids causes shielding gas to be supplied on the region where the welding arc is to be fired and cooling water to be supplied to the Gun. In addition, 2CRa, and 2CRb, are closed. At 2CRa the biasing potential is applied to the variable resistor P2. At this time this potential is determined by the setting of P4 which is set so that the motor rotates at a low speed suitable for advancing the electrode E towards the work W. At 2CRb the circuit through the armature A is closed. The electrode E advances towards the work and as the electrode E advances to the work W the work and the electrode are purged by shielding gas. The electrode E ultimately contacts the work W and the portion of the electrode in engagement with the work is rapidly fused causing an arc to be fired. The firing of the arc actuates relay 3CR closing contacts 3CRa and 3CRb. At 3CRa the motor M is locked into a circuit which is energized as long as current flows through the electrode E and the work W. At 3CRb the relay 5CR is actuated opening contact 5CRa and connecting the potential of the arm of P2 at the preset running magnitude. The electrode E is now supplied at normal welding speed into the welding arc. By the operation of the rectifier SCR the supply of the electrode is at a uniform speed and the arc is smooth.

At the end of the welding operation stop switch SWT is opened deenergizing 1TD and 2CR. 1TDa remains closed for a short interval of time to permit the welding current to delay without producing a crater.

The operation of the apparatus is illustrated in the graphs in FIGS. 4A, 4B, 4C and 4D. In each graph voltage is plotted vertically and timed horizontally. The graphs are labeled describing their significance.

In FIG. 4A, the anode-cathode voltage on the silicon controlled rectifier SCR is plotted vertically as a function of time. The shaded areas represent the intervals during which the rectifier SCR is conducting. The conduction is affected by the discharge of the capacitor 3C through the four-layer diode 6RX. The discharge is represented by the vertical lines in the curve representing the potential on 3C. The discharge produces the sharp firing pulses shown in FIG. 4D.

While a preferred embodiment has been disclosed herein many modifications thereof are possible. This invention then is not to be restricted except insofar as is ncessitated by the spirit of the prior art.

I claim as my invention:

1. Apparatus for arc welding work with a consumable electrode comprising a motor connected to said electrode for advancing said electrode into arc welding relationship with the work, a silicon-controlled rectifier having an anode, a cathode and a gate, power-supply conductors for supplying alternating current, means connecting said conductors, and said anode and cathode in power supply relationship with said motor, means responsive to the loading imposed by said electrode on said motor for deriving a direct-current potential dependent on the magnitude of said loading, a capacitor, a source of controlling alternating potential, means connecting said source, said deriving means and said motor in charging relationship with said capacitor with the back electromotive force of said motor opposing said loading-dependent potential supplied by said deriving means, a discharge circuit for said capacitor including a four-layer diode, said capacitor discharging through said four-layer diode when its potential reaches a predetermined magnitude and when so discharging producing potential pulses, and means connected to said gate for impressing said pulses thereon to render said rectifier conducting at instants in the periods of the alternating potential impressed by said power-supply conductors dependent on said loading.

2. The apparatus of claim 1 characterized by that the controlling alternating potential and the alternatng potential of the supply conductors are of the same frequency and by that the loading dependent potential is so poled as to cause the pulses to occur the earlier in the half periods of the alternating potential of the supply conductors the greater the loading of the electrode on the motor.

3. The apparatus of claim 1 characterized by that the anode and cathode of the silicon controlled rectifier are connected to conduct current through the motor only during alternating half periods of one polarity of the supply and by means connected to said motor for suppressing the potential of said motor produced by the decay of flux in said motor built up during said half periods and occurring during the intervening half periods of opposite polarity to maintain the welding arc smooth and continuous by suppressing spurious conduction of said silicon controlled rectifier during said intervening half periods.

References Cited
UNITED STATES PATENTS

| | | | |
|---|---|---|---|
| 2,823,331 | 2/1958 | Bichsel et al. | 314—70 |
| 2,845,524 | 7/1958 | Morley et al. | 219—130 |
| 2,845,526 | 7/1958 | Cameron et al. | 219—131 |
| 2,866,080 | 12/1958 | Gamberg et al. | 219—131 |
| 2,897,342 | 7/1959 | Bichsel et al. | 219—130 |

RICHARD M. WOOD, *Primary Examiner.*

R. F. STAUBLY, *Assistant Examiner.*